United States Patent
Lee et al.

(10) Patent No.: US 11,958,555 B2
(45) Date of Patent: Apr. 16, 2024

(54) TORQUE SENSOR

(71) Applicant: LG INNOTEK CO., LTD., Seoul (KR)

(72) Inventors: Su Hyoung Lee, Seoul (KR); Myung Chul Woo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1131 days.

(21) Appl. No.: 16/630,788

(22) PCT Filed: Jan. 11, 2018

(86) PCT No.: PCT/KR2018/000538
§ 371 (c)(1),
(2) Date: Jan. 13, 2020

(87) PCT Pub. No.: WO2019/022325
PCT Pub. Date: Jan. 31, 2019

(65) Prior Publication Data
US 2021/0086828 A1 Mar. 25, 2021

(30) Foreign Application Priority Data

Jul. 24, 2017 (KR) .......................... 10-2017-0093349
Sep. 8, 2017 (KR) .......................... 10-2017-0115189

(51) Int. Cl.
*B62D 6/10* (2006.01)
*B62D 15/02* (2006.01)
(Continued)

(52) U.S. Cl.
CPC ............... *B62D 6/10* (2013.01); *B62D 15/02* (2013.01); *G01L 3/1428* (2013.01); *G01L 5/221* (2013.01); *G01L 19/147* (2013.01); *G01L 19/148* (2013.01)

(58) Field of Classification Search
CPC .......... B62D 6/10; B62D 15/02; G01L 3/104; G01L 3/1428; G01L 5/221; G01L 19/147; G01L 19/148
See application file for complete search history.

(56) References Cited

U.S. PATENT DOCUMENTS 8,943,879 B2 * 2/2015 Kang .................. B62D 6/10
73/117.02
9,821,846 B2 * 11/2017 Schoepe .................. G01D 5/14
(Continued)

FOREIGN PATENT DOCUMENTS

CN 103134628 6/2013
CN 104949781 9/2015
(Continued)

OTHER PUBLICATIONS

International Search Report dated Apr. 24, 2018 issued in Application No. PCT/KR2018/000538.
(Continued)

*Primary Examiner* — Octavia Davis Hollington
(74) *Attorney, Agent, or Firm* — KED & ASSOCIATES, LLP

(57) ABSTRACT

An embodiment can provide a torque sensor comprising: a housing; a rotor that is arranged inside the housing; a stator that is arranged on an outer side of the rotor; a circuit board that is arranged in the housing; a Hall-effect sensor that is arranged on the circuit board; and a collector that is arranged adjacent to the Hall-effect sensor, wherein the collector includes a body portion and an extension portion extending from the body portion, the body portion is arranged to be spaced apart from the housing, and the extension portion is directly in contact with the housing.

19 Claims, 12 Drawing Sheets

(51) Int. Cl.
*G01L 3/14* (2006.01)
*G01L 5/22* (2006.01)
*G01L 19/14* (2006.01)

(56) References Cited

U.S. PATENT DOCUMENTS

| | | |
|---|---|---|
| 2011/0005340 A1 | 1/2011 | Jeon et al. |
| 2013/0133437 A1 | 5/2013 | Woo |
| 2015/0276519 A1 | 10/2015 | Hama et al. |
| 2016/0214648 A1 | 7/2016 | Schoepe et al. |
| 2016/0325781 A1 | 11/2016 | Choi |
| 2020/0264062 A1* | 8/2020 | Park .................. G01L 5/221 |

FOREIGN PATENT DOCUMENTS

| | | | |
|---|---|---|---|
| CN | 105849519 | | 8/2016 |
| EP | 2600129 | | 6/2013 |
| JP | 2015-184220 | | 10/2015 |
| JP | 2015-190816 | | 11/2015 |
| KR | 10-2009-0097378 | | 9/2009 |
| KR | 10-0976701 | | 8/2010 |
| KR | 10-2011-0061743 | | 6/2011 |
| KR | 10-2012-0062134 | | 6/2012 |
| KR | 20120133404 A | * | 12/2012 |
| KR | 10-2013-0059565 | | 6/2013 |
| KR | 20140002155 A | * | 1/2014 |
| KR | 10-2015-0018282 | | 2/2015 |
| KR | 20150082919 A | * | 7/2015 |
| KR | 101640945 B1 | * | 7/2016 |
| KR | 20160137495 A | * | 11/2016 |
| KR | 101859768 B1 | * | 5/2018 |

OTHER PUBLICATIONS

European Search Report dated Mar. 18, 2021 issued in Application No. 18839179.1.

Chinese Office Action dated Feb. 22, 2021 issued in Application No. 201880049515.7.

Korean Office Action issued in Application No. 10-2017-0093349 dated Aug. 18, 2021.

Japanese Office Action issued in Application No. 2020-502138 dated Oct. 12, 2021.

* cited by examiner

[FIG. 1]
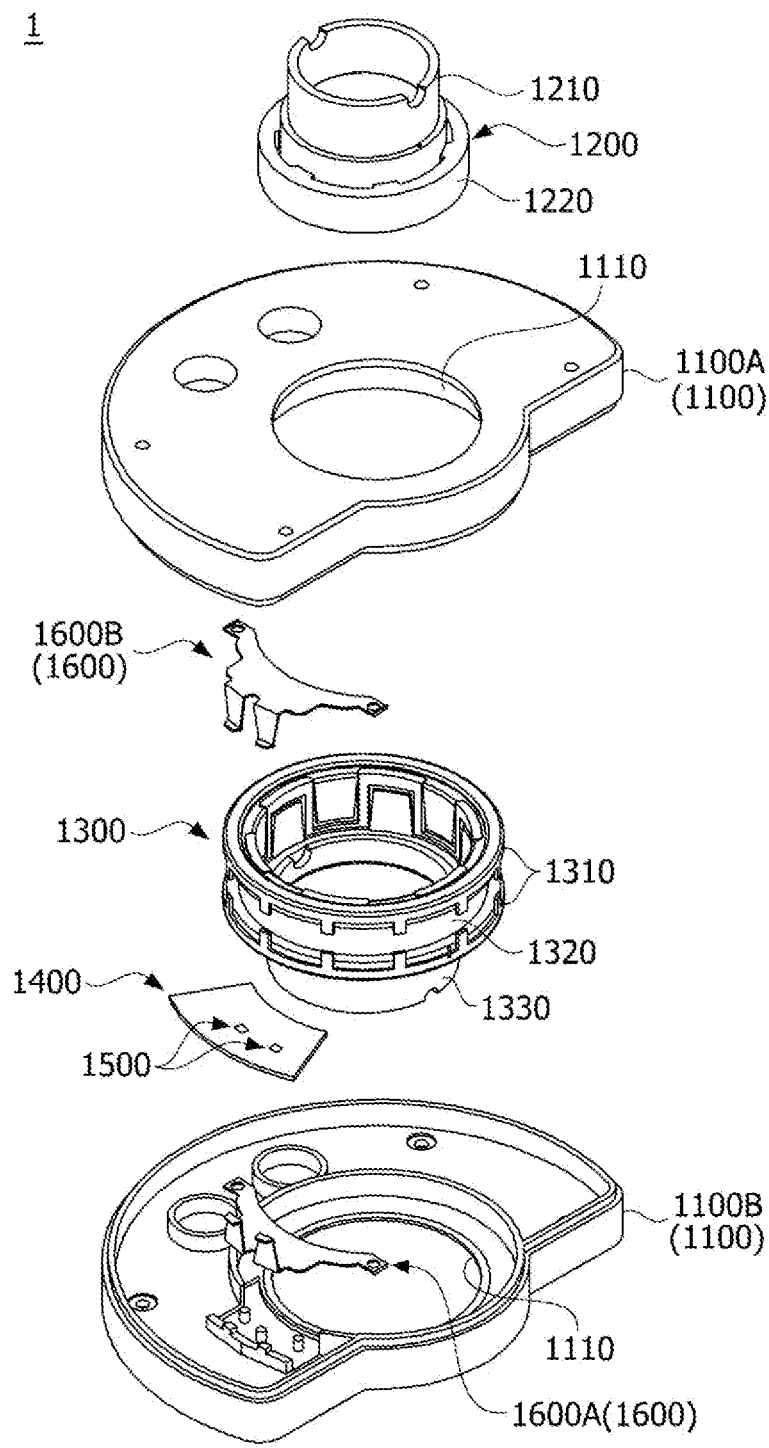

[FIG. 2]
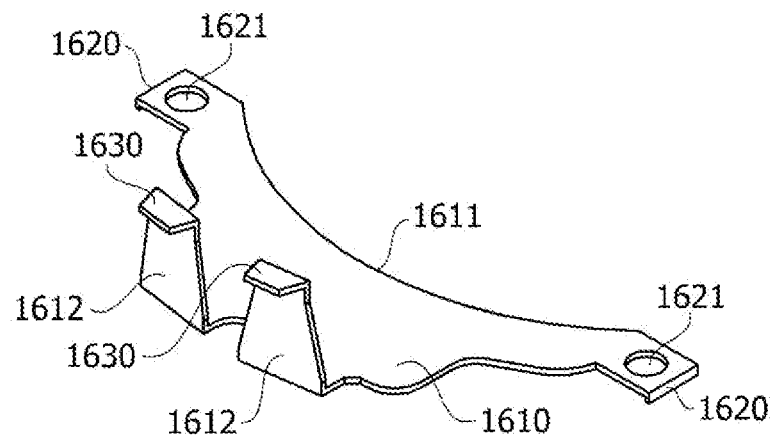
[FIG. 3]
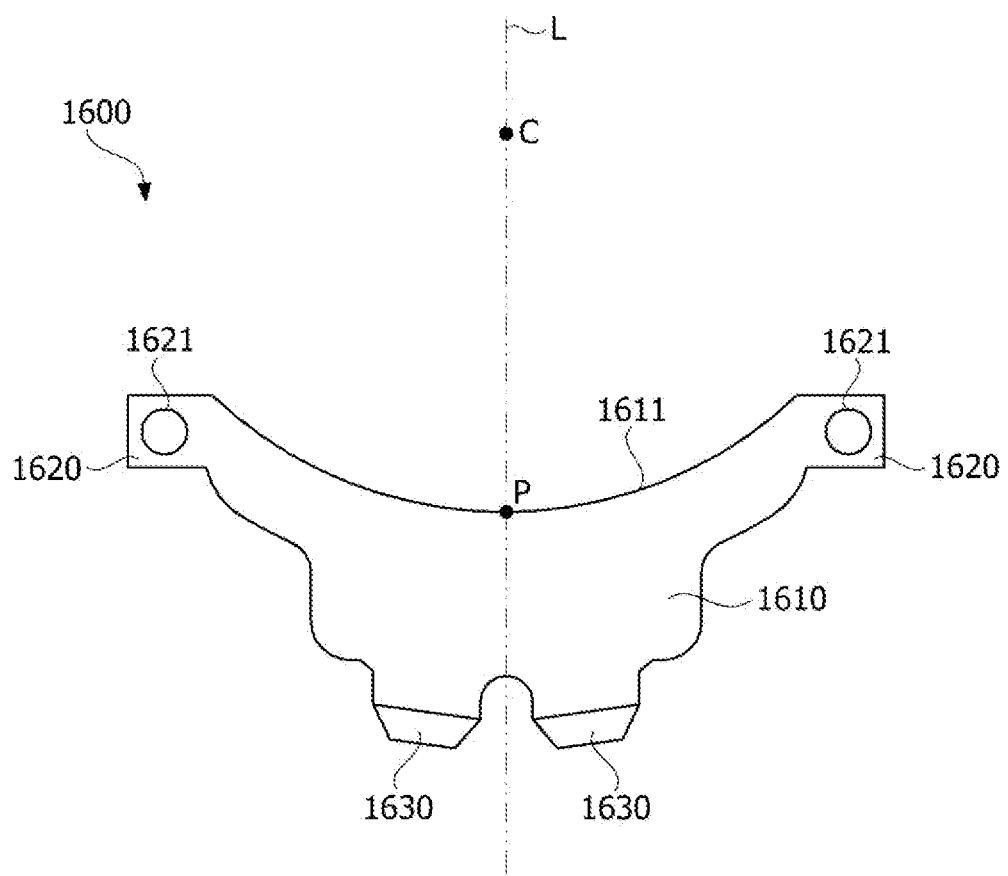

[FIG. 4]
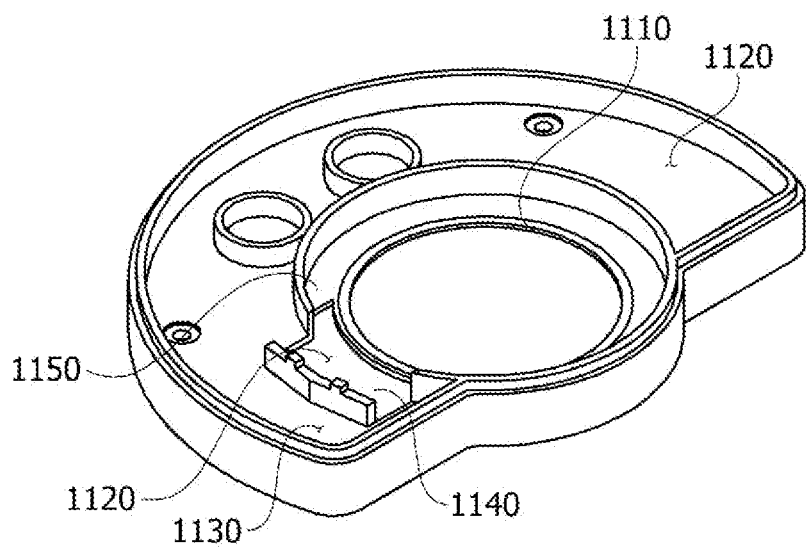
[FIG. 5]
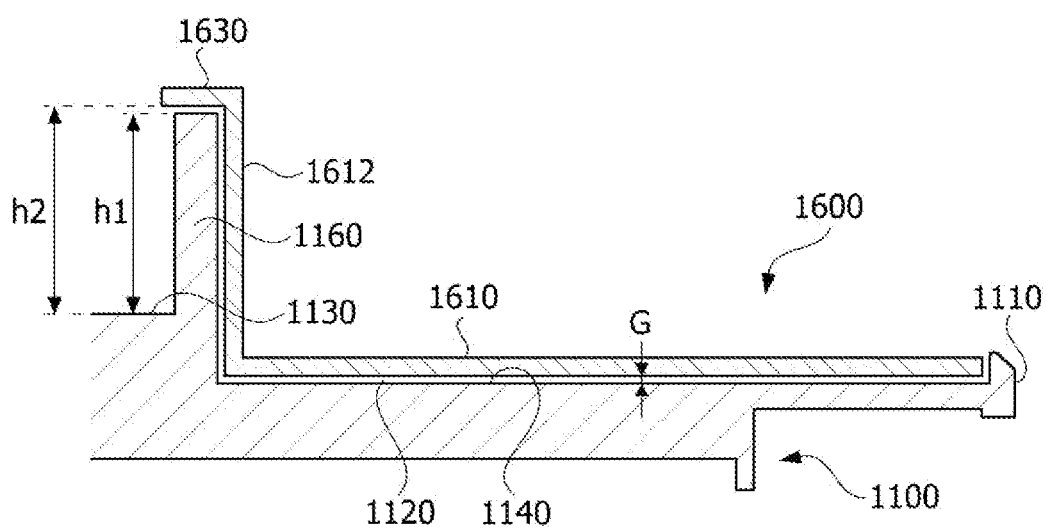

[FIG. 6]
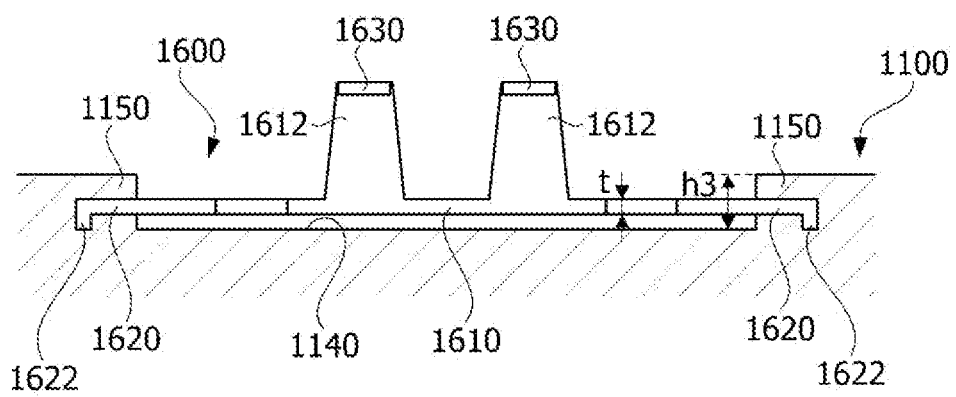
[FIG. 7]
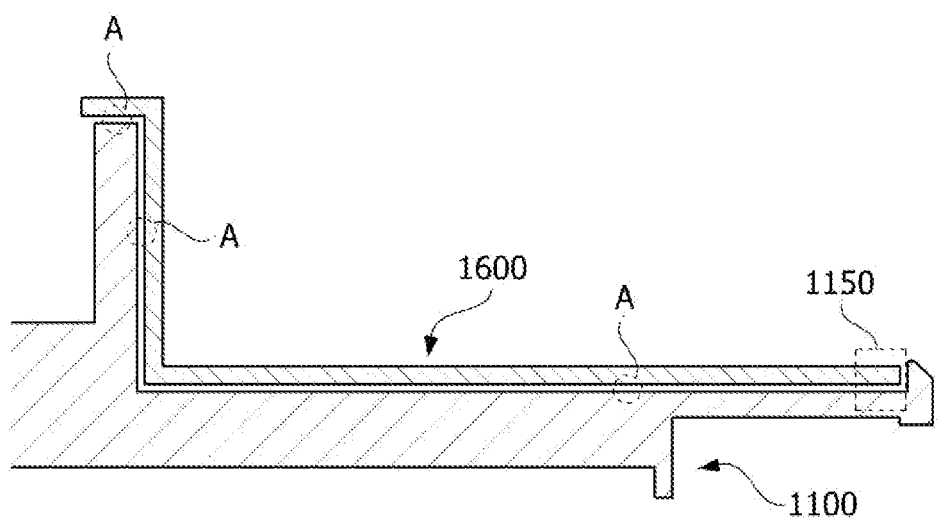

[FIG. 8]
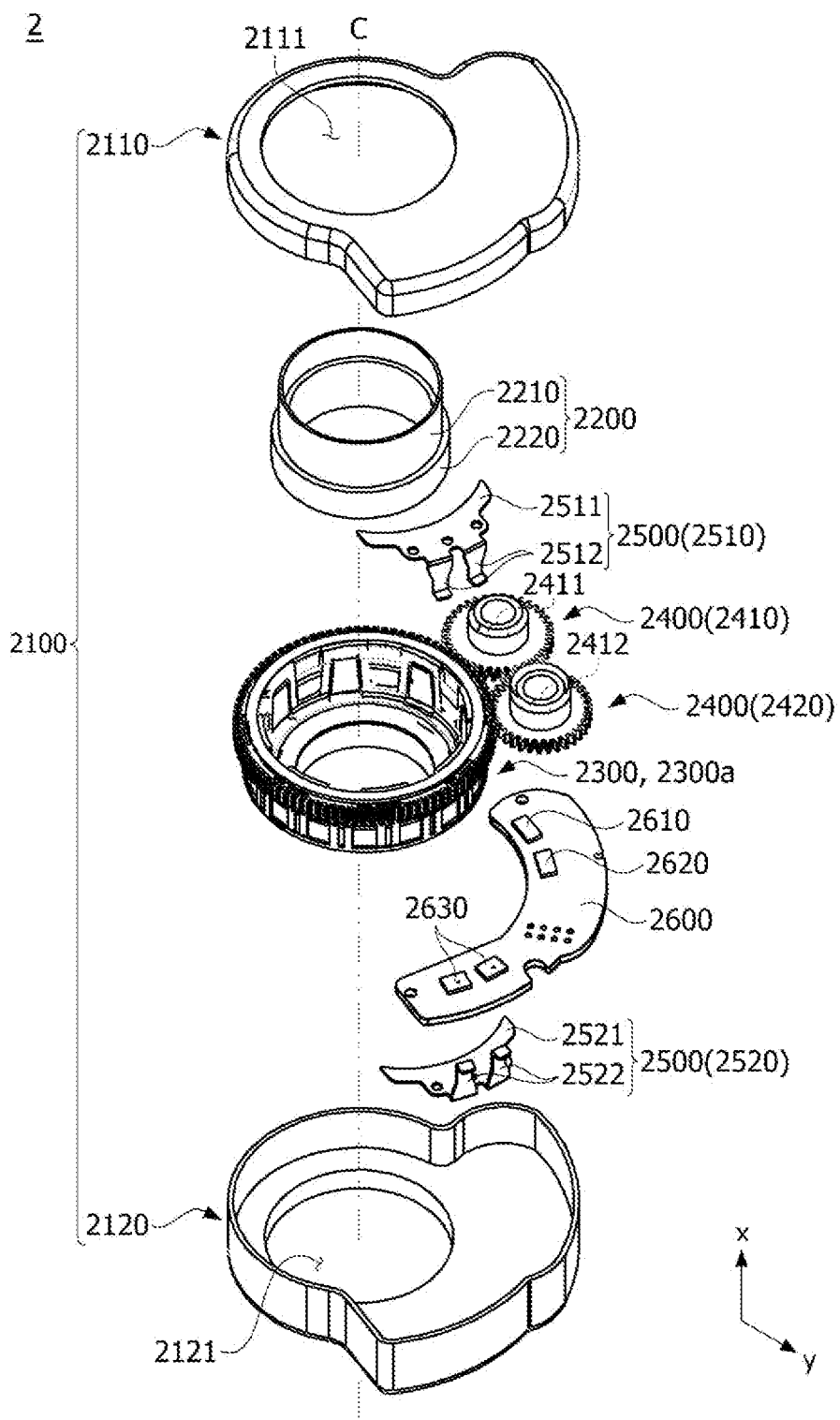

[FIG. 9]
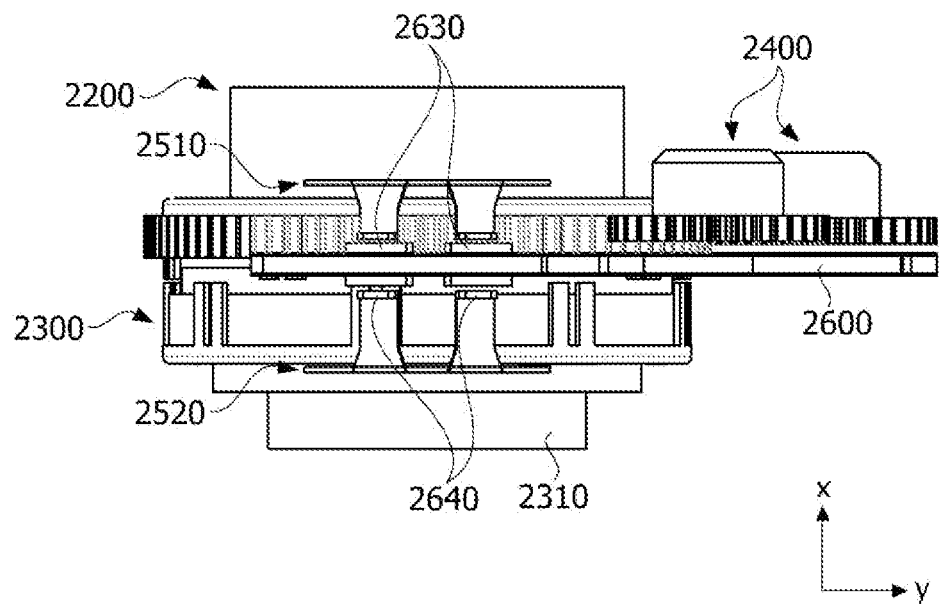
[FIG. 10]
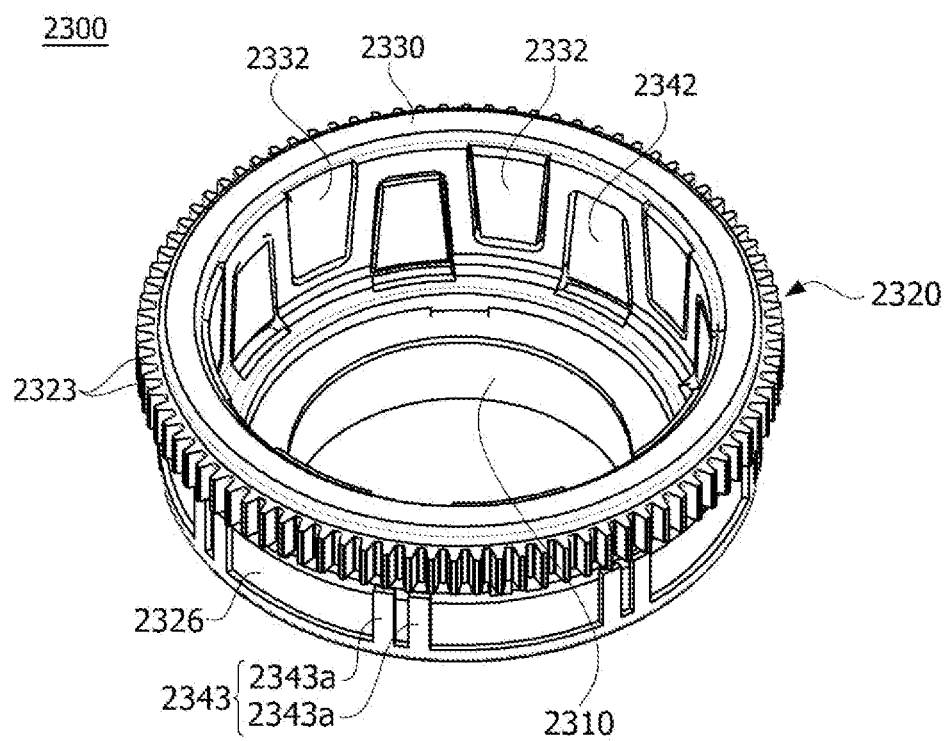

[FIG. 11]
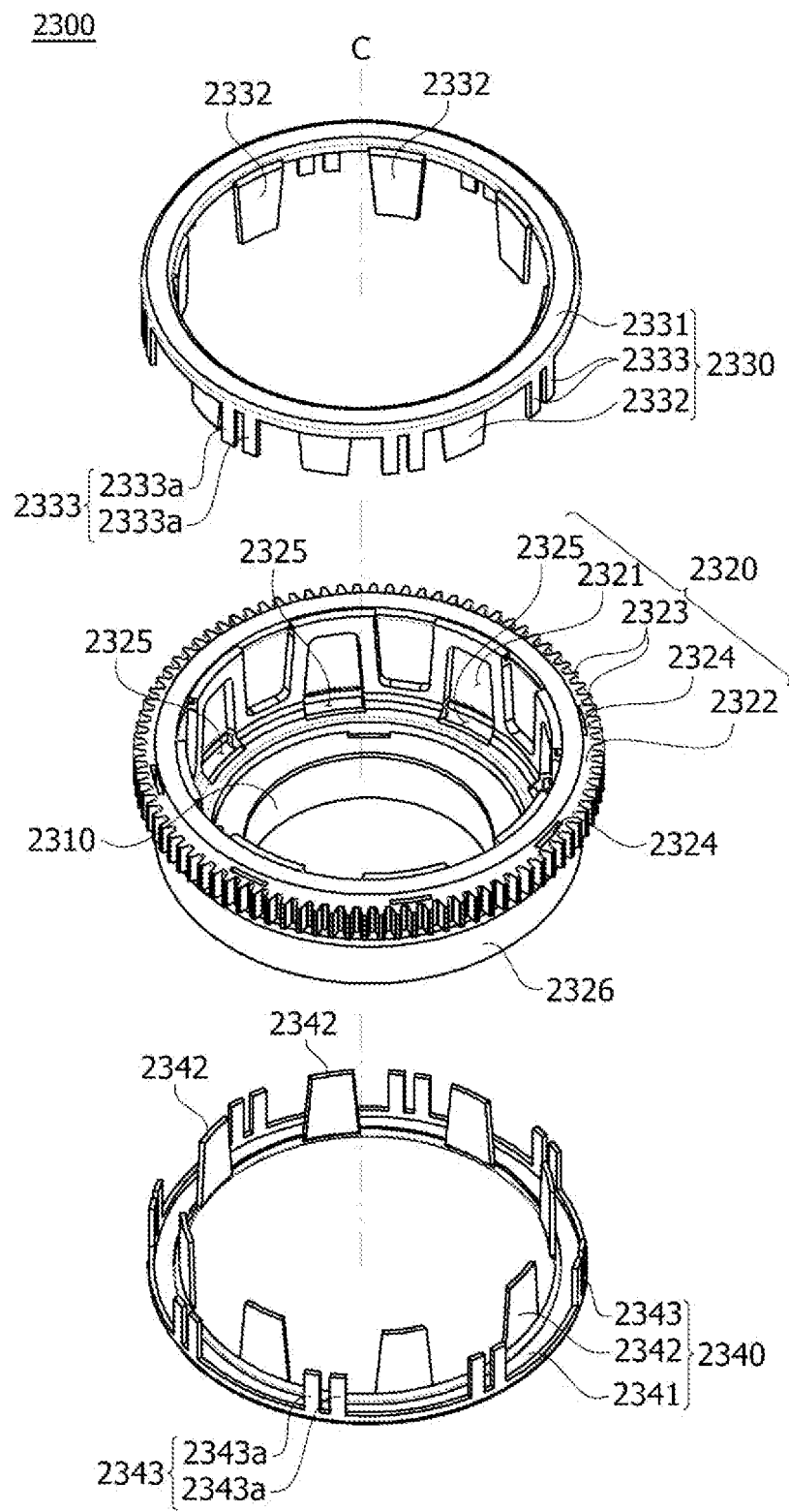

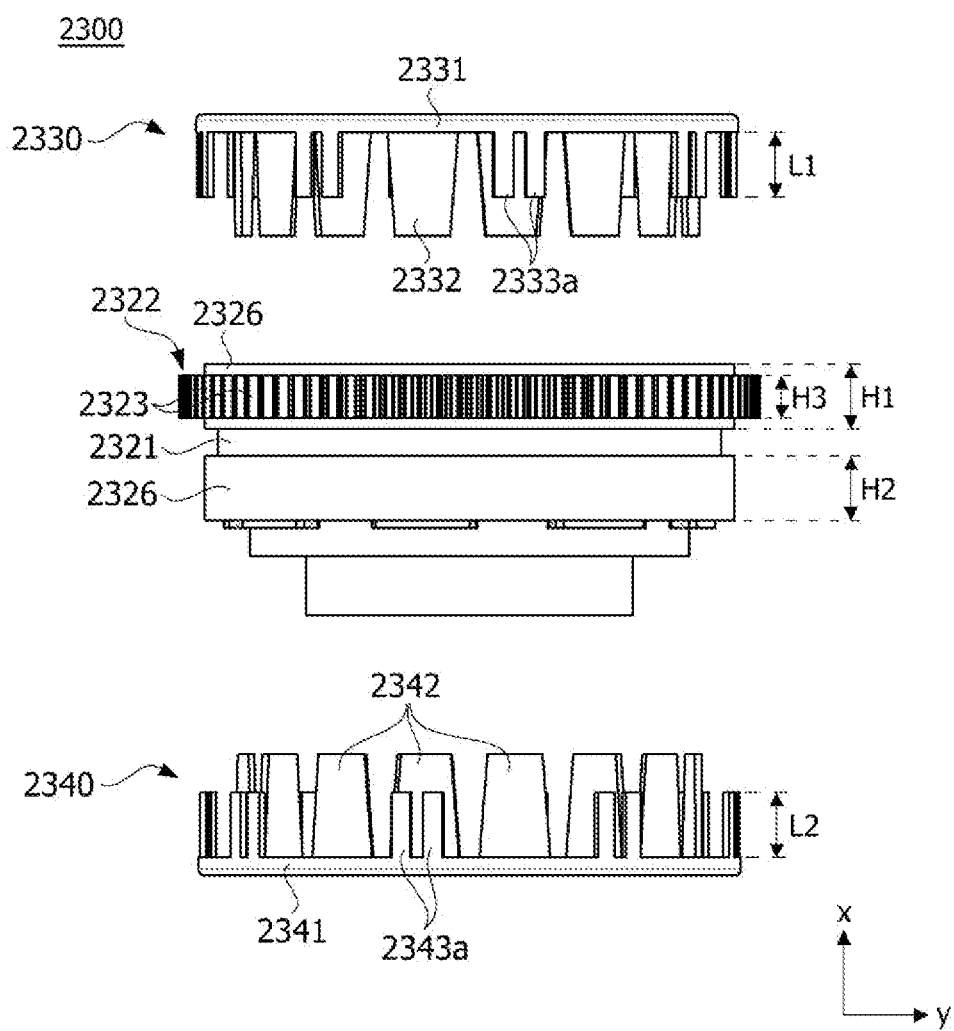
[FIG. 12]

[FIG. 13]
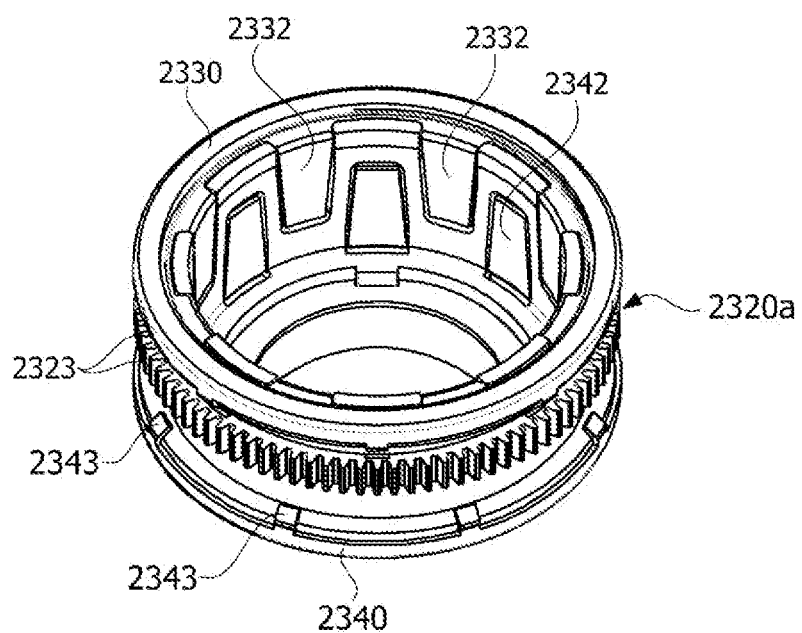

【FIG. 14】
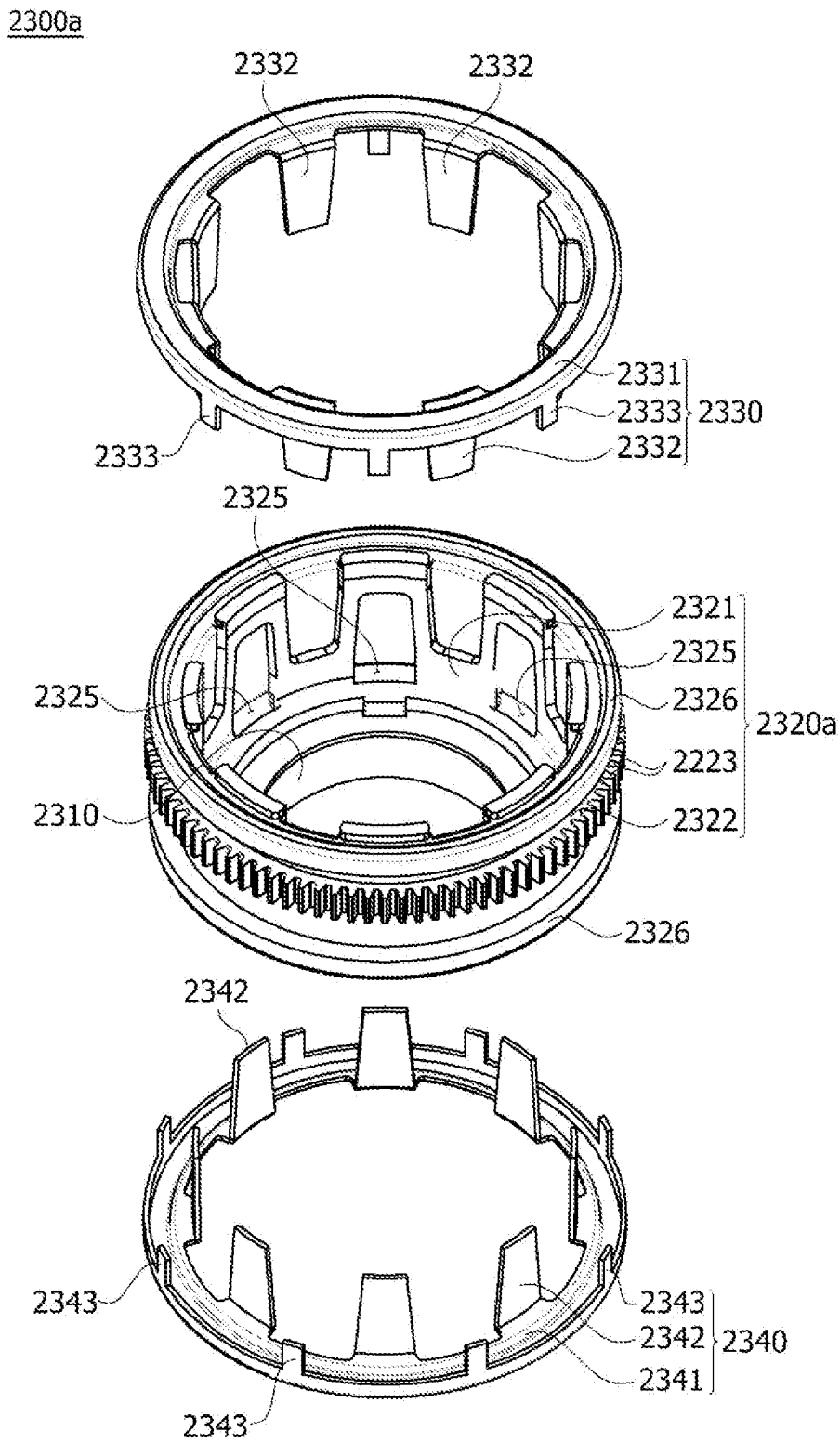

[FIG. 15]
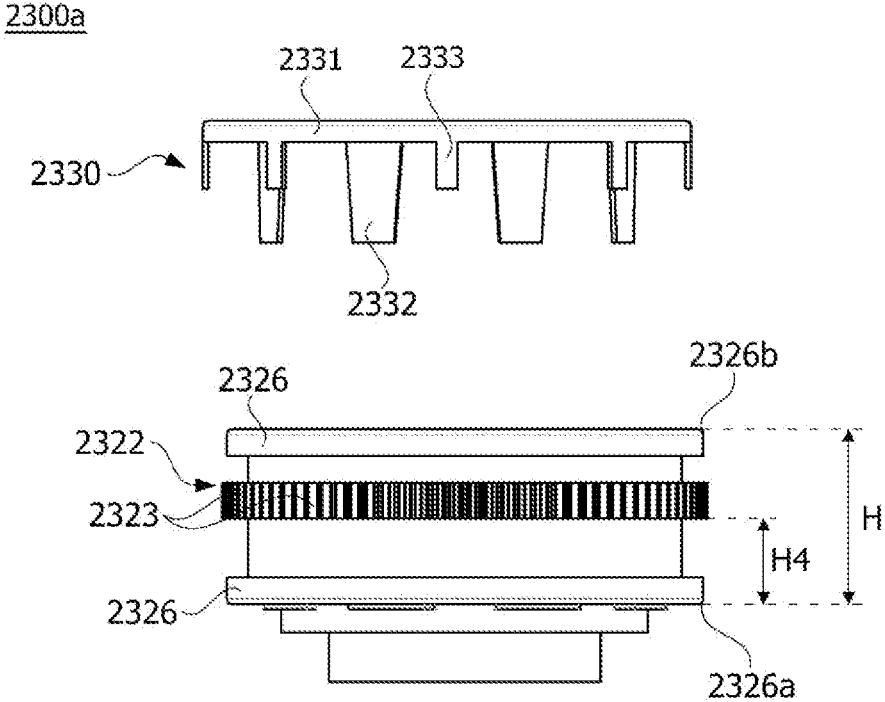

[FIG. 16]
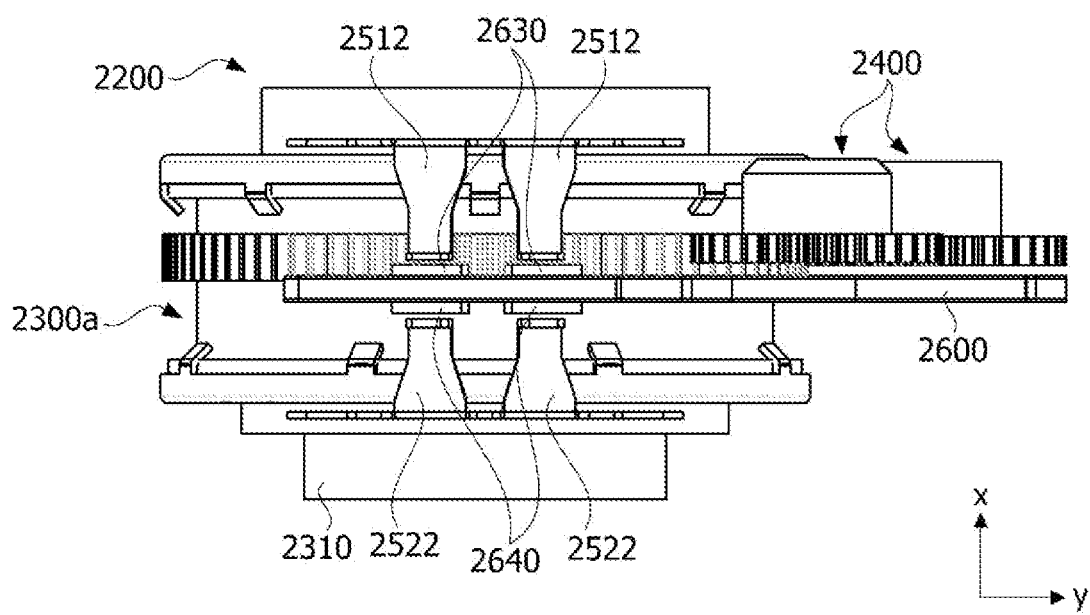

TORQUE SENSOR

CROSS-REFERENCE TO RELATED PATENT APPLICATIONS

This application is a U.S. National Stage Application under 35 U.S.C. § 371 of PCT Application No. PCT/KR2018/000538, filed Jan. 11, 2018, which claims priority to Korean Patent Application Nos. 10-2017-0093349, filed Jul. 24, 2017 and 10-2017-0115189, filed Sep. 8, 2017, whose entire disclosures are hereby incorporated by reference.

TECHNICAL FIELD

An embodiment relates to a torque sensor.

BACKGROUND ART

Electronic power steering systems (hereinafter, referred to as "EPS") allow an electronic control unit (ECU) to drive a motor according to driving conditions to secure turning stability and rapidly provide a restoring force so that a driver can travel stably.

EPSs include a torque sensor that measures the torque of a steering shaft to provide appropriate torque. The steering shaft may include an input shaft connected to a steering wheel, an output shaft connected to a power transmission system of a wheel side, and a torsion bar that connects the input shaft to the output shaft.

The torque sensor measures the torque applied to the steering shaft by measuring the degree of torsion of the torsion bar. Such a torque sensor may include a rotor, a stator, and a collector. The collector measures an amount of magnetization of the stator.

The collector is made of a metallic material in the form of a thin plate. In addition, the collector is fixed to a housing. The collector is fixed to the housing by an operation such as thermal fusion or ultrasonic fusion. At this point, deformation may be generated in the collector while the collector is fixed to the housing. When the collector is deformed, the magnetization amount measurement performance of the collector is significantly degraded.

Further, the mounting position of the collector corresponding to the sensor is a very important factor that determines the measurement performance of the collector. Thus, the collector should be accurately placed in the mounting position and should not move after placement. However, when the collector is fixed to the housing using a fixing method such as thermal fusion or ultrasonic fusion, it is not easy to mount the collector at a correct position. In addition, managing processes is difficult in such a fixing method, and a defect may occur in a fusion portion, causing a problem in which the collector moves.

Meanwhile, in the torque sensor, a main gear is separated and a separate middle case should be provided to maintain the engagement between the main gear and a sub gear.

Accordingly, the torque sensor has a problem in that the number of parts is increased and thus an assembly process is added, thus increasing production costs.

Thus, the torque sensor has a problem in that coping with the current demand requiring miniaturization is difficult.

DISCLOSURE

Technical Problem

An embodiment is directed to providing a torque sensor capable of securely fixing a collector in a correct position without causing deformation in the collector in a process of fixing the collector to a housing.

An embodiment is also directed to providing a torque sensor in which a main gear engaged with a sub gear is integrated with a stator.

Objectives to be achieved by embodiments of the present invention are not limited to the above-described objectives, and other objectives, which are not described above, may be clearly understood by those skilled in the art through the following description.

Technical Solution

One aspect of the present invention provides a torque sensor including a housing, a rotor disposed inside the housing, a stator disposed outside the rotor, a circuit board disposed in the housing, a Hall sensor disposed on the circuit board, and a collector disposed adjacent to the Hall sensor, wherein the collector includes a body portion and an extension portion extending from the body portion, the body portion is disposed to be spaced apart from the housing, and the extension portion is in direct contact with the housing.

The housing may include a fixing portion configured to fix the extension portion of the collector, and the extension portion may be surrounded by and in contact with the fixing portion and may include a through hole.

The collector may include a bent portion facing the Hall sensor, and a part of the extension portion of the collector may be farthest from the bent portion.

The collector may include a bent portion facing the Hall sensor, the body portion may include a curved portion, and the extension portion may be disposed to be closer to the stator than the bent portion and disposed to be farther from a reference line than the bent portion based on the reference line passing through a center of the curved portion and a rotation center of the rotor.

A bottom surface of the housing may include a first surface and a second surface, the second surface may be disposed to be lower than the first surface, and the second surface may include a recessed portion in which the collector is disposed.

A fixing portion may be disposed to protrude from the second surface.

A thickness of the collector may be less than a height from the second surface to an upper end of the fixing portion.

The housing may include a support block, and the support block may protrude from the first surface and may be disposed at a circumference of the recessed portion.

The collector may include a bent portion facing the Hall sensor, and the body portion may further include a leg portion, the leg portion may be disposed to be bent at an outer side edge of the body portion, the bent portion may be disposed to be bent outward from the leg portion, and the leg portion and the bent portion may be disposed to be spaced apart from the support block.

The extension portion may include a hook portion, and the hook portion may be disposed to be bent at an end portion of the extension portion.

Another aspect of the present invention provides a torque sensor including a rotor including a magnet, and a stator disposed outside the rotor, wherein the stator includes a base having a cylindrical shape, a holder coupled to an outer side of the base, and a first stator ring and a second stator ring that are coupled to the holder, the holder includes a main body and a flange portion protruding from the main body in a circumferential direction, gear teeth are formed on an outer circumferential surface of the flange portion, and the flange portion includes a first hole passing therethrough in an axial direction.

The first stator ring may include a first body having a ring shape, a first tooth extending from an inner circumferential surface of the first body in the axial direction, and a first protrusion portion extending from an outer circumferential surface of the first body in the axial direction, and the first protrusion portion may pass through the first hole.

The second stator ring may include a second body having a ring shape, a second tooth extending from an inner circumferential surface of the second body in the axial direction, and a second protrusion portion extending from an outer circumferential surface of the second body in the axial direction, and a length of the second protrusion portion may be different from a length of the first protrusion portion.

Each of the first protrusion portion and the second protrusion portion may be provided as two or more protrusions disposed to be spaced apart from each other.

Still another aspect of the present invention provides a torque sensor including a rotor including a magnet, and a stator disposed outside the rotor, wherein the stator includes a base having a cylindrical shape, a holder coupled to an outer side of the base, and a first stator ring and a second stator ring that are coupled to the holder, the holder includes a main body and a flange portion protruding from the main body in a circumferential direction, gear teeth are formed on an outer circumferential surface of the flange portion, and the flange portion is disposed to be spaced apart from each of an upper portion edge and a lower portion edge of the main body by a predetermined distance.

A length of a first leg of a first collector disposed adjacent to the first stator ring may be different from a length of a second leg of a second collector disposed adjacent to the second stator ring.

The torque sensor may further include a first sub gear engaged with the gear teeth of the flange portion, a second sub gear engaged with the first sub gear, and a circuit board including a magnetic element, wherein the magnetic element may sense magnetization of a sub magnet disposed in each of the first sub gear and the second sub gear.

The torque sensor may further include a first sensor and a second sensor that are disposed on the circuit board, wherein the first sensor may be disposed to face a first leg of a first collector, and the second sensor may be disposed to face a second leg of a second collector.

The torque sensor may include a pair of first flange portions disposed on an upper portion and a lower portion of the main body to be spaced apart from each other, wherein the flange portion may be disposed to be spaced apart from each of a lower portion edge of the first flange portion disposed on the lower portion of the main body and an upper portion edge of the first flange portion disposed on the upper portion of the main body by a predetermined distance.

A lower surface of the flange portion may be positioned at a predetermined height (H4) from the lower portion edge of the first flange portion, and the height (H4) may be positioned in a range of ½ to ⅔ of a height (H) of the main body based on the lower portion edge of the first flange portion.

Advantageous Effects

According to embodiments, an advantageous effect is provided in which the deformation of a collector is not generated in a process of fixing the collector to a housing.

According to embodiments, an advantageous effect is provided in which a collector can be fixed in a correct position.

According to embodiments, an advantageous effect is provided in which the fixing force between a collector and a housing is increased.

According to embodiments, an advantageous effect is provided in which the measurement performance of a collector is improved.

According to embodiments, an advantageous effect is provided in which the assembly process of a collector and a housing is simplified.

According to embodiments, a main gear engaged with a sub gear can be integrated with a holder of a stator to realize miniaturization. That is, since the main gear is integrally formed with the holder in a torque sensor, the torque sensor can be easily manufactured, and a conventionally-used middle case can be omitted so that the torque sensor can be miniaturized.

Further, a clearance conventionally formed between a stator and a main gear, which is coupled to interlock with the rotation of the stator, can be prevented by integrally forming the main gear with a holder of the stator.

Further, since a main gear is integrally formed with a holder, the rotational force of the holder can be transferred to the main gear as it is and thus a sensing capability can be improved.

Further, the assembly process of a torque sensor can be simplified by providing a stator in which a main gear is formed integrally with a holder.

DESCRIPTION OF DRAWINGS

FIG. 1 is a view illustrating a torque sensor according to a first embodiment.

FIG. 2 is a view illustrating a collector illustrated in FIG. 1.

FIG. 3 is a plan view of the collector illustrated in FIG. 2.

FIG. 4 is a view illustrating a housing illustrated in FIG. 1.

FIG. 5 is a side cross-sectional view of the collector and the housing with respect to a recessed portion of the housing disposed in the torque sensor according to the first embodiment.

FIG. 6 is a cross-sectional view of an extension portion of the collector coupled to a fixing portion of the housing disposed in the torque sensor according to the first embodiment.

FIG. 7 is a view illustrating the collector disposed to be spaced apart from the housing disposed in the torque sensor according to the first embodiment.

FIG. 8 is an exploded perspective view illustrating a torque sensor according to a second embodiment.

FIG. 9 is a side view of a rotor of the torque sensor according to the second embodiment, and a stator, a sub gear, a collector, and a circuit board according to the first embodiment.

FIG. 10 is a perspective view illustrating a stator according to a first embodiment of the torque sensor according to the second embodiment.

FIG. 11 is an exploded perspective view illustrating the stator according to the first embodiment of the torque sensor according to the second embodiment.

FIG. 12 is a side view illustrating the stator according to the first embodiment of the torque sensor according to the second embodiment.

FIG. 13 is a perspective view illustrating a stator according to a second embodiment of the torque sensor according to the second embodiment.

FIG. 14 is an exploded perspective view illustrating the stator according to the second embodiment of the torque sensor according to the second embodiment.

FIG. 15 is a side view illustrating the stator according to the second embodiment of the torque sensor according to the second embodiment.

FIG. 16 is a side view of the rotor of the torque sensor according to the second embodiment, and the stator, the sub gear, the collector, and the circuit board according to the second embodiment.

MODES OF THE INVENTION

The present invention may be modified in various forms and have various embodiments, and thus particular embodiments thereof will be illustrated in the accompanying drawings and described in the detailed description. However, it should be understood that the present invention is not limited to the particular embodiments and includes all modifications, equivalents, and substitutes included in the concept and technical scope of the present invention.

Although terms including ordinal numbers such as first, second, and the like may be used to describe various components, the components are not limited by these terms. The terms are only used to distinguish one component from another. For example, without departing from the scope of the present invention, a second component could be termed a first component, and, similarly, a first component could be termed a second component. A term "and/or" includes combinations of a plurality of related items or any one of the plurality of related items.

When a component is referred to as being "connected" or "coupled" to another component, it should be understood that the component can be directly connected or coupled to another component or additional component may be interposed therebetween. In contrast, when a component is referred to as being "directly connected" or "directly coupled" to another component, it should be understood that no additional component is interposed between the above-described components.

In the description of the embodiments, a term "on" or "under" in a case in which another component is disclosed to be formed "on" or "under" another component includes both a case in which the two components are directly in contact with each other and a case in which at least one additional component is formed to be disposed between the two components. Further, the term "on or under" may refer to not only an upward direction but also a downward direction based on one component.

Terms used herein are for the purpose of describing particular embodiments only and are not intended to be limiting of the present invention. As used herein, singular forms are intended to include plural forms as well, unless the context clearly indicates otherwise. It will be further understood that the terms "comprises," "comprising," "includes," and/or "including" when used herein, specify the presence of stated features, integers, steps, operations, components, elements, and/or a combination thereof, but do not preclude the presence or addition of one or more other features, integers, steps, operations, components, elements, and/or a combination thereof.

Unless otherwise defined, all terms including technical or scientific terms used in the present invention have meanings the same as those of terms generally understood by those skilled in the art. Generally used terms defined in a dictionary should be interpreted to have meanings the same as meanings in the context of the related art and are not interpreted as ideal or excessively formal meanings unless the present invention clearly defines otherwise.

Hereinafter, embodiments will be described in detail with reference to the accompanying drawings, the same reference numerals are applied to the same or corresponding components regardless of the drawing numerals, and redundant descriptions thereof will be omitted.

First Embodiment

FIG. 1 is a view illustrating a torque sensor according to a first embodiment.

Referring to FIG. 1, a torque sensor 1 according to the first embodiment may include a housing 1100, a rotor 1200, a stator 1300, a circuit board 1400, and a Hall sensor 1500 (a Hall integrated circuit (IC)), and a collector 1600.

The housing 1100 may include an upper part and a lower part that are coupled to each other. In addition, the housing 1100 includes a hole 1110 disposed in a center thereof. The stator 1300 is positioned inside the hole 1110. The circuit board 1400 and the collector 1600 may be disposed inside the housing 1100.

The rotor 1200 is disposed inside the stator 1300. The rotor 1200 is connected to an input shaft of a steering shaft. Here, the input shaft may be a steering shaft connected to a steering wheel of a vehicle. The rotor 1200 may include a yoke 1210 having a cylindrical shape and a magnet 1220 disposed around the yoke 1210. The input shaft is inserted into the yoke 1210. In addition, the magnet 1220 may be disposed on an outer side of the yoke 1210. The magnet 1220 may be adhesively fixed or press-fitted to an outer circumferential surface of the yoke 1210.

The stator 1300 is disposed outside the rotor 1200. The stator 1300 may include stator teeth 1310 having an annular shape, a mold member 1320, and a holder 1330. A pair of stator teeth 1310 may be disposed to be spaced apart from each other in a form of facing each other. In addition, two stator teeth 1310 may be fixed to an upper side and a lower side of the mold member 1320, respectively. The holder 1330 is coupled to the mold member 1320. The holder 1330 may be connected to an output shaft of the steering shaft. Here, the output shaft may be a steering shaft connected to a power transmission system of a wheel side. Accordingly, the stator 1300 is connected to the output shaft to rotate together with the output shaft.

The circuit board 1400 may be fixed to the housing 1100. A connector may be disposed on the circuit board 1400 and is connected to an electronic control unit (ECU).

The Hall sensor 1500 is mounted on the circuit board 1400. The Hall sensor 1500 detects an amount of magnetization of the stator 1300 generated due to an electrical interaction between the magnet 1220 of the rotor 1200 and the stator 1300.

The collector 1600 collects a flux of the stator 1300. The collector 1600 may include an upper collector 1600A and a lower collector 1600B. The upper collector 1600A and the lower collector 1600B may be disposed to be spaced apart from each other based on an axial direction of the rotor 1200. The Hall sensor 1500 is disposed between the upper collector 1600A and the lower collector 1600B based on the axial direction of the rotor 1200.

FIG. 2 is a view illustrating the collector illustrated in FIG. 1.

Referring to FIG. 2, the collector 1600 may include a body portion 1610, an extension portion 1620, and a bent portion 1630.

The body portion 1610 is a member disposed adjacent to the stator 1300 and configured to collect the flux of the stator 1300. In addition, the extension portion 1620 is a member configured to fix the collector 1600 to the housing 1100. The body portion 1610 is disposed to be spaced apart from the housing 1100, and the extension portion 1620 is disposed to be in direct contact with the housing 1100. Specifically, it may be implemented such that the extension portion 1620 is insert-injected into the housing 1100 to be integrated in a state in which the body portion 1610 is spaced apart from the housing 1100.

The collector 1600 is a plate-shaped member that has a constant thickness and may be a member made of metal. The body portion 1610, the extension portion 1620, and the bent portion 1630 are described separately according to shapes and functional characteristics thereof but may be a single piece connected to each other.

An inner side edge of the body portion 1610 may include a curved portion 1611. Here, the term "inner side" refers to a direction toward the stator 1300 when the collector 1600 is disposed, and the term "outer side" refers to a direction opposite to the direction toward the stator 1300. The curved portion 1611 is disposed along a circumference of the stator 1300 when the collector 1600 is fixed to the housing 1100.

A leg portion 1612 extends from an outer side edge of the body portion 1610. The leg portion 1612 is bent in the direction of the axis of the rotor 1200 at the outer side edge of the body portion 1610 and has a predetermined height. Two leg portions 1612 may be disposed. The bent portion 1630 is connected to the leg portion 1612. The bent portion 1630 may be disposed to be bent outward at an upper end of the leg portion 1612. The bent portion 1630 is disposed to face the Hall sensor 1500. A width of the leg portion 1612 may be formed to increase in a direction toward the outer side edge of the body portion 1610 from the bent portion 1630.

FIG. 3 is a plan view of the collector illustrated in FIG. 2.

Referring to FIGS. 2 and 3, the curved portion 1611 of the body portion 1610 may be disposed such that a center of curvature of the curved portion 1611 coincides with a rotation center C of the rotor 1200 (in FIG. 1) when the collector 1600 is fixed to the housing 1100. In addition, the overall shape of the collector 1600 may be formed to be symmetrical based on a reference line L passing through a center P of the curved portion 1611 and the rotation center C.

The extension portion 1620 may be disposed in a region of the body portion 1610 that is farthest from the bent portion 1630 among the region of the body portion 1610. The extension portion 1620 is portioned in a region that does not affect a flux of the bent portion 1630. For example, the bent portion 1630 is disposed to be close to the reference line L and disposed on an outer side of the body portion 1610. On the other hand, the extension portion 1620 is disposed at the maximum distance from the reference line L and disposed on an inner side of the body portion 1610. That is, the extension portion 1620 may be disposed as far away from the bent portion 1630 inwardly as possible, and at the same time, at the maximum distance from the reference line L.

Specifically, the extension portion 1620 may be disposed on each of both side surfaces of the body portion 1610. The extension portion 1620 may be disposed to extend from each of both ends of the curved portion 1611. Two extension portions 1620 may be disposed to be symmetrical with respect to the reference line L.

Meanwhile, the extension portion 1620 may include a through hole 1621. In a process in which the extension portion 1620 is insert-injected into the housing 1100, an injected object passes through the through-hole 1621, thereby increasing a coupling force between the extension portion 1620 and the housing 1100.

FIG. 4 is a view illustrating the housing illustrated in FIG. 1.

The housing 1100 of FIG. 4 may be either one of an upper part 1100A (in FIG. 1) and a lower part 1100B (in FIG. 1). Referring to FIG. 4, the housing 1100 may include a recessed portion 1120. In addition, a bottom surface of the housing 1100 may include a first surface 1130 and a second surface 1140. The recessed portion 1120 is disposed on the second surface 1140. The recessed portion 1120 is a portion in which the collector 1600 is accommodated. A planar shape of the recessed portion 1120 may correspond to a planar shape of the collector 1600.

In addition, the housing 1100 may include a fixing portion 1150. The fixing portion 1150 fixes the extension portion 1620 of the collector 1600. The fixing portion 1150 may be a part of the housing 1100 protruding from the second surface 1140. The fixing portion 1150 may be disposed at a circumference of the hole 1110 of the housing 1100. In addition, the fixing portion 1150 may be disposed at each of both sides of the recessed portion 1120.

FIG. 5 is a side cross-sectional view of the collector and the housing with respect to the recessed portion of the housing disposed in the torque sensor according to the first embodiment.

Referring to FIGS. 4 and 5, the recessed portion 1120 is disposed adjacent to the hole 1110. The second surface 1140 in which the recessed portion 1120 is positioned is disposed to be lower than the first surface 1130. A support block 1160 may be disposed at a boundary between the first surface 1130 and the second surface 1140. The support block 1160 structurally supports the leg portion 1612 and the bent portion 1630 of the collector 1600 to restrict the collector 1600 from being deformed or moved over a predetermined displacement. Such a support block 1160 protrudes from the first surface 1130 and is disposed to have a predetermined height. A height h1 from the first surface 1130 to an upper end of the support block 1160 should be less than a height h2 of the bent portion 1630 from the first surface 1130.

A gap G is formed between the second surface 1140 of the housing 1100 and the body portion 1610. That is, a surface of the body portion 1610 is not in contact with the housing 1100. Accordingly, the surface of the body portion 1610 may be prevented from being deformed or damaged by coming into contact with the housing 1100 and thus prevented from affecting the flux. In addition, the leg portion 1612 and the bent portion 1630 may also be disposed to be spaced apart from the support block 1160.

FIG. 6 is a cross-sectional view of the extension portion of the collector coupled to the fixing portion of the housing disposed in the torque sensor according to the first embodiment.

Referring to FIGS. 5 and 6, the extension portion 1620 of the collector 1600 is fixed to the fixing portion 1150 of the housing 1100. The fixing portion 1150 may be disposed to protrude from the second surface 1140 of the housing 1100. The fixing portion 1150 is disposed to surround the extension portion 1620. The extension portions 1620 disposed on both sides of the body portion 1610 may be fixed to the fixing portion 1150 in the form of being insert-injected into the fixing portion 1150 in a state in which the body portion 1610 is spaced apart from the second surface 1140.

A height h3 from the second surface 1140 to the upper end of the fixing portion 1150 is greater than a thickness t of the collector 1600. That is, the thickness t of the collector 1600 is less than the height h3 from the second surface 1140 to the upper end of the fixing portion 1150.

Meanwhile, the extension portion 1620 may include a hook portion 1622. The hook portion 1622 is disposed in a form in which an end portion of the extension portion 1620 is bent. The hook portion 1622 constrains the extension portion 1620 inside the fixing portion 1150 so that the collector 1600 is not separated from the fixing portion 1150.

Such a configuration of the collector 1600 may be similarly applied to both the upper collector 1600A (in FIG. 1) and the lower collector 1600B (in FIG. 1).

FIG. 7 is a view illustrating the collector disposed to be spaced apart from the housing disposed in the torque sensor according to the first embodiment.

Referring to FIG. 7, the collector 1600 is disposed to be spaced apart from the housing 1100 while maintaining a gap indicated by A in FIG. 7 in a state of being fixed to the fixing portion 1150. Accordingly, it is possible to fundamentally prevent the surface of the collector 1600 from being damaged or deformed by coming into contact with the housing 1100 and thus prevent affecting the flux.

Second Embodiment

A torque sensor 2 according to a second embodiment may be disposed between an input shaft (not shown) and an output shaft (not shown) of a steering shaft. Here, the torque sensor 2 may be referred to as a sensor assembly.

FIG. 8 is an exploded perspective view illustrating the torque sensor according to the second embodiment, and FIG. 9 is a side view of a rotor, a stator, a sub gear, a collector, and a circuit board of the torque sensor according to the second embodiment. Here, an x-direction illustrated in FIGS. 8 and 9 represents an axial direction, and a y-direction represents a radial direction. In addition, the axial direction is perpendicular to the radial direction.

Referring to FIGS. 8 and 9, the torque sensor 2 according to the second embodiment may include a housing 2100, a rotor 2200 connected to the input shaft, a stator 2300 or 2300a connected to the output shaft, a sub gear 2400, a collector 2500, and a circuit board 2600.

Here, a sub magnet may be disposed in the sub gear 2400, and a magnetic element configured to sense the magnetization of the sub magnet may be disposed on the circuit board 2600. In addition, a sensor configured to measure torque may be disposed on the circuit board 2600.

The housing 2100 may form an exterior of the torque sensor 2. Here, the housing 1100 of the torque sensor 1 according to the first embodiment may be used instead of the housing 2100 of the torque sensor 2 according to the second embodiment. In addition, the collector 1600 of the torque sensor 1 according to the first embodiment may be used instead of the collector 2500 of the torque sensor 2 according to the second embodiment.

The housing 2100 may include a first housing 2110 and a second housing 2120 that are coupled to each other so that an accommodation space is formed therein. Here, the first housing 2110 may be referred to as an upper part. In addition, the second housing 2120 may be referred to as a lower part.

A first through hole 2111 through which the input shaft passes may be formed in the first housing 2110, and a second through hole 2121 through which the output shaft (not shown) passes may be formed in the second housing 2120. Here, the input shaft may be connected to a steering wheel side, and the output shaft may be connected to a wheel side.

Meanwhile, the rotor 2200, the stator 2300 or 2300a, the sub gear 2400, the collector 2500, and the circuit board 2600 may be disposed in the accommodation space.

The rotor 2200 is disposed inside the stator 2300 or 2300a. The rotor 2200 is connected to the input shaft of the steering shaft, and here, the input shaft may refer to the steering shaft connected with the steering wheel of a vehicle.

The rotor 2200 may include a yoke 2210 having a cylindrical shape and a magnet 2220 disposed around the yoke 2210. The input shaft is inserted into the yoke 2210. In addition, the magnet 2220 may be disposed on an outer side of the yoke 2210. For example, the magnet 2220 may be adhesively fixed or press-fitted to an outer circumferential surface of the yoke 2210.

The stator 2300 or 2300a is disposed outside the rotor 2200.

FIG. 10 is a perspective view illustrating a stator according to a first embodiment of the torque sensor according to the second embodiment, FIG. 11 is an exploded perspective view illustrating the stator according to the first embodiment of the torque sensor according to the second embodiment, and FIG. 12 is a side view illustrating the stator according to the first embodiment of the torque sensor according to the second embodiment.

Referring to the stator 2300 according to the first embodiment with reference to FIGS. 10 to 12, the stator 2300 may include a base 2310, a holder 2320, a first stator ring 2330, and a second stator ring 2340.

The base 2310 may be formed in a cylindrical shape. In addition, the base 2310 may be connected to the output shaft of the steering shaft. Here, the output shaft may be connected to the power transmission system of the wheel side. Accordingly, the stator 2300 is connected to the output shaft to rotate together with the output shaft.

The base 2310 may be formed of a metallic material. However, the present invention is not necessarily limited thereto, and it is understood that a material having a predetermined strength may be used so that the output shaft may be fitted.

The first stator ring 2330 and the second stator ring 2340 may be disposed to be fixed to the holder 2320.

The holder 2320 may include a main body 2321, a flange portion 2322, gear teeth 2323, a first hole 2324, and a second hole 2325.

The main body 2321 may be disposed at one side end portion of the base 2310. For example, the main body 2321 may be disposed on one side end portion of the base 2310 using an insert-injection method that uses a synthetic resin such as a resin.

The first stator ring 2330 and the second stator ring 2340 that are disposed to be spaced apart from each other and to face each other in the axial direction may be disposed in the main body 2321.

The flange portion 2322 may be formed to protrude outward from the main body 2321 in a circumferential direction. In addition, the flange portion 2322 may be integrally formed with the main body 2321. Here, the term "inward" refers to a direction toward a center C of the main body 2321, and the term "outward" refers to a direction opposite to the "inward" direction.

As illustrated in FIG. 11, the flange portion 2322 may be disposed on an upper portion side of the main body 2321.

Here, an upper surface of the main body 2321 may be coplanar with an upper surface of the flange portion 2322.

The gear teeth 2323 may be integrally formed with the flange portion 2322 on an outer circumferential surface of the flange portion 2322. In addition, the gear teeth 2323 may be engaged with gear teeth of a first sub gear 2410. Accordingly, when the main body 2321 rotates, the gear teeth 2323 rotate in conjunction with the rotation. In addition, the first sub gear 2410 rotates in conjunction with the rotation of the gear teeth 2323.

That is, when the separately manufactured main gear and stator are coupled to each other, a clearance may be generated between the main gear and the stator and concentricity therebetween may be decreased, and thus hysteresis may decrease and sensing performance may be degraded. Here, the hysteresis may be defined as the difference between an output when the main gear rotates counterclockwise and an output when the main gear rotates clockwise.

Accordingly, in order to avoid such a problem, the tolerance and concentricity between the main gear and the stator should be precisely adjusted, and thus the costs of a mold are increased and an assembly process is complicated.

Thus, in the embodiment, the main body 2321, the flange portion 2322, and the gear teeth 2323 of the holder 2320 are integrally formed such that the rotation of the holder 2320 is transmitted to the first sub gear 2410 without change. Accordingly, the sensing capability of the torque sensor 2 may be improved.

In addition, the structure in which the main body 2321, the flange portion 2322, and the gear teeth 2323 of the holder 2320 are integrally formed simplifies the assembly process. In addition, a separate middle case disposed to secure a space allowing the main gear to operate therein may be removed so that the above-described structure enables miniaturization of the torque sensor 2.

The first hole 2324 may be formed in the flange portion 2322. Referring to FIG. 11, the first hole 2324 is formed to pass through the flange portion 2322 in the axial direction. In addition, a first protrusion portion 2333 of the first stator ring 2330 may be inserted into the first hole 2324.

The second hole 2325 may be formed in the main body 2321. As illustrated in FIGS. 10 and 11, a plurality of second holes 2325 may be formed in the main body 2321 to be spaced apart from each other in the circumferential direction. In addition, second teeth 2342 of the second stator ring 2340 may be inserted into the second holes 2325.

In addition, since the second teeth 2342 are inserted into the second holes 2325, the second teeth 2342 may be disposed on an inner surface of the main body 2321.

The stator rings 2330 and 2340 may be configured in a pair.

The first stator ring 2330 may include a first body 2331 having a ring shape, a plurality of first teeth 2332 extending from an inner circumferential surface of the first body 2331 in the axial direction, and a plurality of first protrusion portions 2333 extending from an outer circumferential surface of the first body 2331 in the axial direction. Here, the first teeth 2332 and the first protrusion portions 2333 may be formed to protrude in the same direction. For example, the first teeth 2332 and the first protrusion portions 2333 may protrude toward the second stator ring 2340.

In addition, the first body 2331, the first teeth 2332, and the first protrusion portions 2333 may be integrally formed.

The second stator ring 2340 may include a second body 2341 having a ring shape, a plurality of second teeth 2342 extending from an inner circumferential surface of the second body 2341 in the axial direction, and a plurality of second protrusion portions 2343 extending from an outer circumferential surface of the second body 2341 in the axial direction. Here, the second teeth 2342 and the second protrusion portions 2343 may be formed to protrude in the same direction. For example, the second teeth 2342 and the second protrusion portions 2343 may protrude toward the first stator ring 2330.

In addition, the second body 2341, the second teeth 2342, and the second protrusion portions 2343 may be integrally formed.

As illustrated in FIGS. 10 and 11, the first stator ring 2330 may be disposed on an upper portion of the main body 2321, the second stator ring 2340 may be disposed on a lower portion of the main body 2321, and the first stator ring 2330 and the second stator ring 2340 may be disposed to be spaced apart from each other. Here, the first teeth 2332 of the first stator ring 2330 and the second teeth 2342 of the second stator ring 2340 may be disposed to engage with each other at a predetermined interval in the circumferential direction.

The first protrusion portion 2333 may pass through the first hole 2324. Here, one end portion region of the first protrusion portion 2333 may be exposed to the outside at the first hole 2324 formed in the flange portion 2322.

In addition, the first protrusion portion 2333 may be fixed to the flange portion 2322 using a caulking method that presses the exposed end portion of the first protrusion portion 2333 to bend. Accordingly, a coupling force between the first protrusion portions 2333 with respect to the flange portion 2322 may be increased.

The second protrusion portions 2343 may be fixed to an outer circumferential surface of the main body 2321.

Meanwhile, a pair of first flange portions 2326 may be further formed in the main body 2321 in consideration of a caulking force due to the caulking of the first protrusion portions 2333 and the second protrusion portions 2343.

Referring to FIG. 12, the pair of first flange portions 2326 may be disposed on the upper portion and the lower portion of the main body 2321, respectively, to be spaced apart from each other. In addition, the first flange portions 2326 may be formed to protrude outward from the main body 2321 in the circumferential direction. Here, the first flange portions 2326 may be integrally formed with the main body 2321.

In addition, the flange portion 2322 may be disposed on the first flange portion 2326 that is disposed on the upper portion of the main body 2321.

Accordingly, the first protrusion portions 2333 may be fixed to the first flange portion 2326 of the upper side by pressing the end portion of each of the first protrusion portion 2333. In addition, the second protrusion portion 2343 may be fixed to the first flange portion 2326 of the lower side by pressing the end portion of the second protrusion portion 2343.

As illustrated in FIG. 12, a height H1 of the first flange portion 2326 of the upper side and a height H2 of the first flange portion 2326 of the lower side may be the same. The height H1 of the first flange portion 2326 of the upper side and the height H2 of the first flange portion 2326 of the lower side may be a thickness of the first flange portion 2326 in the axial direction. Accordingly, the first stator ring 2330 and the second stator ring 2340 may be manufactured in the same shape, and the same mold may be used. Accordingly, the manufacturing costs of the first stator ring 2330 and the second stator ring 2340 may be reduced.

A height H3 of the gear tooth 2323 may be less than the height H1 of the first flange portion 2326 of the upper side. Here, the height H1 of the first flange portion 2326 of the upper side may be based on an upper surface of the first flange portion 2326. In addition, the height H3 of the gear tooth 2323 may be a thickness of the gear tooth 2323 in the axial direction. As illustrated in FIG. 12, the gear teeth 2323 disposed on the outer circumferential surface of the flange portion 2322 may be disposed between one side edge and the other side edge of the first flange portion 2326 of the upper side. However, the present invention is not necessarily limited thereto. For example, one side edge of the flange portion 2322 may be disposed to be adjacent to or to be coplanar with one side edge or the other side edge of the first flange portion 2326 of the upper side in consideration of the arrangement relation with the circuit board 2600.

Meanwhile, a length L2 of the second protrusion portion 2343 may be different from a length L1 of the first protrusion portion 2333. Specifically, the length L2 of the second protrusion portion 2343 may be less than the length L1 of the first protrusion portion 2333. Accordingly, the height H2 of the first flange portion 2326 of the lower side may be less than the height H1 of the first flange portion 2326 of the upper side. Accordingly, one region of the circuit board 2600 may be disposed between the first flange portion 2326 of the lower side and the flange portion 2322 so that an arrangement space for circuits and the like disposed on the circuit board 2600 may be secured, thereby improving the degree of freedom in arranging the circuits.

As illustrated in FIG. 12, when viewed in the radial direction (y-direction), the protrusion portions 2333 and 2343 may be disposed between the teeth 2332 and between the teeth 2342, respectively. When viewed from the radial direction (y-direction), when the protrusion portions 2333 and 2343 are arranged to overlap the teeth 2332 and 2342, a magnetic field may be affected, and thus the protrusion portions 2333 and 2343 are disposed between the teeth 2332 and between the teeth 2342, respectively, to prevent an influence on the magnetic field.

The first protrusion portion 2333 may be provided as two or more first protrusions 2333a that are disposed to be spaced apart from each other. In addition, the second protrusion portion 2343 may be provided as two or more second protrusions 2343a that are disposed to be spaced apart from each other.

The protrusion portions 2333 and 2343 each formed of two protrusions realize a double caulking structure so that the coupling force of the protrusion portions 2333 and 2343 with respect to the flange portions 2322 and 2326 may be further increased. Further, in the double caulking structure, contact areas with the first flange portions 2326 are increased, and thus caulking force of the protrusion portions 2333 and 2343 in a rotational direction may be increased.

FIG. 13 is a perspective view illustrating a stator according to a second embodiment of the torque sensor according to the second embodiment, FIG. 14 is an exploded perspective view illustrating the stator according to the second embodiment of the torque sensor according to the second embodiment, and FIG. 15 is a side view illustrating the stator according to the second embodiment of the torque sensor according to the second embodiment.

Hereinafter, when referring to the stator 2300a according to the second embodiment, the same components as the stator 2300 according to the first embodiment are described with the same reference numerals, and thus detailed descriptions thereof will be omitted.

When comparing the stator 2300 according to the first embodiment and the stator 2300a according to the second embodiment, there is a difference in a position in which the flange portion 2322 is formed in the main body 2321. Accordingly, the stator 2300a according to the second embodiment is different in that the first hole 2324 of the stator 2300 according to the first embodiment is removed.

Referring to FIGS. 13 to 15, the stator 2300a according to the second embodiment may include a base 2310, a holder 2320a, a first stator ring 2330, and a second stator ring 2340. In addition, the holder 2320a of the stator 2300a may include a main body 2321, a flange portion 2322, gear teeth 2323, and a second hole 2325. Here, the flange portion 2322 may be disposed to be spaced apart from each of an upper portion edge and a lower portion edge of the main body 2321 by a predetermined distance.

Further, the holder 2320a of the stator 2300a may include a pair of first flange portions 2326 disposed on an upper portion and a lower portion of the main body 2321 to be spaced apart from each other for fixing the first stator ring 2330 and the second stator ring 2340.

Here, the flange portion 2322 may be disposed between the pair of first flange portions 2326.

In addition, the flange portion 2322 may be disposed to be spaced apart from each of a lower portion edge 2326a of the first flange portion 2326 disposed on the lower portion of the main body 2321 and an upper portion edge 2326b of the first flange portion 2326 disposed on the upper portion of the main body 2321 by a predetermined distance.

Here, a lower surface 2322a of the flange portion 2322 may be positioned at a predetermined height H4 from the lower portion edge 2326a. For example, the height H4 may be positioned in a range of ½ to ⅔ of a height H of the main body 2321 based on the lower portion edge 2326a. Accordingly, a space in which one region of the circuit board 2600 may be disposed may be secured.

The first flange portions 2326 may be disposed on the upper portion and the lower portion of the main body 2321. Here, the first flange portions 2326 may be formed to protrude outward from the main body 2321 in the circumferential direction. That is, the first flange portions 2326 are disposed on the upper portion and the lower portion of the main body 2321, respectively, to be spaced apart from each other.

As illustrated in FIG. 13, an end portion of a first protrusion portion 2333 of the first stator ring 2330 and an end portion of a second protrusion portion 2343 of the second stator ring 2340 may be fixed to the first flange portions 2326, respectively, using a caulking method.

Here, the protrusion portions 2333 and 2334 of the stator 2300a according to the second embodiment are each illustrated as being provided as one protrusion, but are not necessarily limited thereto and may be formed as two protrusions like the protrusion portions 2333 and 2334 of the stator 2300 according to the first embodiment.

The sub gear 2400 may be engaged with the gear teeth 2323 of the stator 2300 or 2300a. As illustrated in FIG. 16, two sub gears 2400 may be disposed. Accordingly, the sub gears 2400 may be divided into a first sub gear 2410 and a second sub gear 2420.

The first sub gear 2410 may be engaged with the gear teeth of the stator 2300 or 2300a. In addition, the second sub gear 2420 may be engaged with the first sub gear 2410.

In this case, although it is illustrated that two sub gears 2400 are arranged to realize an effective rotation amount difference, the present invention is not necessarily limited thereto, and in some cases, one or three or more sub gears 2400 may be disposed.

Referring to FIG. 8, a sub magnet may be disposed in each of the first sub gear 2410 and the second sub gear 2420. For example, a first sub magnet 2411 may be disposed on the first sub gear 2410, and a second sub magnet 2412 may be disposed on the second sub gear 2420.

When torsion is generated between the input shaft and the output shaft, a difference in rotation between the rotor 2200 and the stator 2300 or 2300a is generated, which is sensed as a change in magnetic force.

Here, the collector 2500 allows the sensor disposed on the circuit board 2600 to sense the change in magnetic force.

The collector 2500 may collect a flux of the stator 2300 or 2300a. Here, the collector 2500 may be formed of a metallic material and fixed to the inside of the housing 2100.

As illustrated in FIG. 16, two collectors 2500 may be provided. The collectors 2500 may be divided into a first collector 2510 and a second collector 2520 according to a placement position.

The first collector 2510 may be disposed adjacent to the first stator ring 2330. Here, the term "adjacent to" may mean "disposed to be in contact with" or "to be spaced apart from by a predetermined distance."

The first collector 2510 may include a first plate 2511 and a first leg 2512.

The first plate 2511 may be formed in a plate shape. In addition, the first plate 2511 may be disposed adjacent to a first body 2331 of the first stator ring 2330.

The first leg 2512 may be formed to protrude from the first plate 2511 in the axial direction. Here, the first leg 2512 may be bent outward. Accordingly, an end portion of the first leg 2512 may be bent in the radial direction.

The second collector 2520 may be disposed adjacent to the second stator ring 2340.

The second collector 2520 may include a second plate 2521 and a second leg 2522.

The second plate 2521 may be formed in a plate shape. In addition, the second plate 2511 may be disposed adjacent to the second body 2341 of the second stator ring 2340.

The second leg 2522 may be formed to protrude from the second plate 2521 in the axial direction. Here, the second leg 2522 may be bent outward. Accordingly, an end portion of the second leg 2522 may be bent in the radial direction.

As illustrated in FIGS. 9 and 16, the circuit board 2600 may be disposed between the first stator ring 2330 and the second stator ring 2340.

The circuit board 2600 may include a first magnetic element 2610, a second magnetic element 2620, a first sensor 2630, and a second sensor 2640. Here, the first sensor 2630 and the second sensor 2640 may be torque sensor members that sense torque. In addition, the first magnetic element 2610, the second magnetic element 2620, the first sensor 2630, and the second sensor 2640 may be Hall sensors (Hall ICs).

The first magnetic element 2610 may be disposed at a position corresponding to the first sub magnet 2411 to sense a change in a magnetic field of the first sub magnet 2411. In addition, the second magnetic element 2620 may be disposed at a position corresponding to the second sub magnet 2412 to sense a change in a magnetic field of the second sub magnet 2412. Accordingly, the first magnetic element 2610 and the second magnetic element 2620 may sense a rotation amount and a rotation speed to sense a rotated angle.

The first sensor 2630 may be disposed at a position corresponding to the end portion of the first leg 2512. For example, the first sensor 2630 may be disposed in one region of the circuit board 2600 that is spaced apart from the end portion of the first leg 2512 by a predetermined distance. That is, the first sensor 2630 may be disposed to face the first leg 2512.

The second sensor 2640 may be disposed at a position corresponding to the end portion of the second leg 2522. For example, the second sensor 2640 may be disposed in one region of the circuit board 2600 that is spaced apart from the end portion of the second leg 2522 by a predetermined distance. That is, the second sensor 2640 may be disposed to face the second leg 2522.

A difference in rotation occurs between the rotor 2200 and the stator 2300 or 2300a as the torsion is generated between the input shaft and the output shaft, and the difference in rotation is sensed as a change in magnetic force between the first sensor 2630 and the second sensor 2640 by the collector 2500. Accordingly, the first sensor 2630 and the second sensor 2640 may measure torque that may be used to smoothly adjust the steering wheel.

FIG. 16 is a side view of the rotor of the torque sensor according to the second embodiment, and the stator, the sub gear, the collector, and the circuit board according to the second embodiment.

Referring to FIGS. 15 and 16, in the stator 2300a according to the second embodiment, a lower surface 2322a of the flange portion 2322 may be positioned at a position that is ½ of the height H of the main body 2321 based on the lower portion edge 2326a.

Thus, in order for the circuit board 2600 to be disposed between the first leg 2512 and the second leg 2522, a length of the first leg 2512 and a length of the second leg 2522 may be different from each other. As illustrated in FIG. 16, the length of the second leg 2522 is less than the length of the first leg 2512.

Although the above-described descriptions are described with reference to the embodiments of the present invention, it should be understood that those skilled in the art may be capable of variously modifying and changing within the spirit and the scope of the present invention disclosed in the claims which will be described below. In addition, differences related to modifications and changes should be understood to be included in the scope of the present invention defined in the appended claims.

DESCRIPTION OF REFERENCE NUMERALS 1 and 2: torque sensor, 1100 and 2100: housing, 1200 and 2200: rotor, 1300 and 2300 or 2300a: stator, 1400 and 2600: circuit board, 1500: Hall sensor, 1600 and 2500: collector

The invention claimed is:

1. A torque sensor comprising:
a housing;
a rotor disposed inside the housing;
a stator disposed outside the rotor and inside the housing;
a circuit board disposed in the housing;
a Hall sensor disposed on the circuit board; and
a collector disposed adjacent to the Hall sensor,
wherein the housing includes a support block protruding from a bottom surface of the housing,
the collector includes a body portion, an extension portion extending from the body portion in a circumferential direction, a through hole formed in the extension portion, and a bent portion facing the Hall sensor,
the body portion is disposed to be spaced apart from the housing,
the extension portion is in direct contact with the housing,
the housing includes a fixing portion configured to fix the extension portion of the collector,
the fixing portion is disposed within the through hole in the extension portion, the support block overlaps the bent portion in an axial direction, and
an end surface of the support block is disposed in close proximity to the bent portion.

2. The torque sensor of claim 1, wherein
the extension portion is surrounded by and in contact with the fixing portion.

3. The torque sensor of claim 1, wherein
the through hole in the extension portion of the collector is farther from the bent portion than from the body portion.

4. The torque sensor of claim 1, wherein
the body portion includes a curved portion, and
the extension portion is disposed to be closer to the stator than the bent portion and disposed to be farther from a reference line than the bent portion based on the reference line passing through a center of the curved portion and a rotation center of the rotor.

5. The torque sensor of claim 1, wherein
the bottom surface of the housing includes a first surface and a second surface,
the second surface is disposed to be lower than the first surface, and
the second surface includes a recessed portion in which the collector is disposed.

6. The torque sensor of claim 5, wherein the fixing portion is disposed to protrude from the second surface.

7. The torque sensor of claim 6, wherein a thickness of the collector is less than a height from the second surface to an upper end of the fixing portion.

8. The torque sensor of claim 5, wherein
the support block protrudes from the first surface and is disposed at a circumference of the recessed portion.

9. The torque sensor of claim 8, wherein
the body portion further includes a leg portion,
the leg portion is disposed to be bent at an outer side edge of the body portion,
the bent portion is disposed to be bent outward from the leg portion, and
the leg portion is disposed to be spaced apart from the support block.

10. The torque sensor of claim 1, wherein
the extension portion includes a hook portion, and
the hook portion is disposed to be bent at an end portion of the extension portion.

11. A torque sensor comprising:
a rotor including a magnet; and
a stator disposed outside the rotor,
wherein the stator includes a base having a cylindrical shape, a holder coupled to an outer side of an end of the base, and a first stator ring and a second stator ring that are coupled to the holder,
the holder includes a main body and a flange portion protruding from the main body in a circumferential direction,
gear teeth are formed on an outer circumferential surface of the flange portion,
the first stator ring includes a first body having a ring shape, a first tooth extending from an inner circumferential surface of the first body in an axial direction, and a first protrusion portion extending from an outer circumferential surface of the first body in the axial direction and spaced from the first tooth in a radial direction, and
the first protrusion portion passes through a first hole of the flange portion in the axial direction.

12. The torque sensor of claim 11, wherein
the second stator ring includes a second body having a ring shape, a second tooth extending from an inner circumferential surface of the second body in the axial direction, and a second protrusion portion extending from an outer circumferential surface of the second body in the axial direction, and
a length of the second protrusion portion is different from a length of the first protrusion portion.

13. The torque sensor of claim 12, wherein each of the first protrusion portion and the second protrusion portion is provided as two or more protrusions disposed to be spaced apart from each other.

14. The torque sensor of claim 11, comprising:
a first sub gear engaged with the gear teeth of the flange portion;
a second sub gear engaged with the first sub gear; and
a circuit board including a magnetic element,
wherein the magnetic element senses magnetization of a sub magnet disposed in each of the first sub gear and the second sub gear.

15. The torque sensor of claim 14, further comprising a first sensor and a second sensor that are disposed on the circuit board,
wherein the first sensor is disposed to face a first leg of a first collector, and
the second sensor is disposed to face a second leg of a second collector.

16. A torque sensor comprising:
a rotor including a magnet; and
a stator disposed outside the rotor,
wherein the stator includes a base having a cylindrical shape, a holder coupled to an outer side of an end of the base, and a first stator ring and a second stator ring that are coupled to the holder,
the holder includes a main body and a flange portion protruding from the main body in a circumferential direction,
gear teeth are formed on an outer circumferential surface of the flange portion,
the first stator ring includes a first body having a ring shape, a first tooth extending from an inner circumferential surface of the first body in an axial direction, and a first protrusion portion extending from an outer circumferential surface of the first body in the axial direction and spaced from the first tooth in a radial direction,
the first protrusion portion passes through a first hole of the flange portion in the axial direction, and
the flange portion is disposed to be spaced apart from each of an upper portion edge and a lower portion edge of the main body by a predetermined distance.

17. The torque sensor of claim 16, wherein a length of a first leg of a first collector disposed adjacent to the first stator ring is different from a length of a second leg of a second collector disposed adjacent to the second stator ring.

18. The torque sensor of claim 16, further comprising a pair of first flange portions disposed on an upper portion and a lower portion of the main body to be spaced apart from each other,
wherein the flange portion is disposed to be spaced apart from each of a lower portion edge of the first flange portion disposed on the lower portion of the main body and an upper portion edge of the first flange portion disposed on the upper portion of the main body by a predetermined distance.

19. The torque sensor of claim 18, wherein a lower surface of the flange portion is positioned at a predetermined height (H4) from the lower portion edge of the first flange portion, and the height (H4) is positioned in a range of ½ to ⅔ of a height (H) of the main body based on the lower portion edge of the first flange portion.

\* \* \* \* \*